US012768649B2

(12) United States Patent
Le Garrec et al.

(10) Patent No.: US 12,768,649 B2
(45) Date of Patent: Oct. 20, 2026

(54) DEVICE FOR DETECTING FROSTING INTENSITY FOR AN AIRCRAFT IN FLIGHT

(71) Applicant: SAFRAN AEROSYSTEMS, Plaisir (FR)

(72) Inventors: Stéphane Le Garrec, Moissy-Cramayel (FR); Philippe Portier, Moissy-Cramayel (FR); Marius Gurau, Moissy-Cramayel (FR)

(73) Assignee: SAFRAN AEROSYSTEMS, Plaisir (FR)

(*) Notice: Subject to any disclaimer, the term of this patent is extended or adjusted under 35 U.S.C. 154(b) by 412 days.

(21) Appl. No.: 18/007,412

(22) PCT Filed: Jul. 29, 2021

(86) PCT No.: PCT/FR2021/051426
§ 371 (c)(1),
(2) Date: Jan. 30, 2023

(87) PCT Pub. No.: WO2022/023683
PCT Pub. Date: Feb. 3, 2022

(65) Prior Publication Data

US 2023/0304793 A1 Sep. 28, 2023

(30) Foreign Application Priority Data

Jul. 31, 2020 (FR) ...................................... 2008204

(51) Int. Cl.
*B64D 15/20* (2006.01)
*G01B 21/08* (2006.01)

(52) U.S. Cl.
CPC ............. *G01B 21/08* (2013.01); *B64D 15/20* (2013.01)

(58) Field of Classification Search
CPC ........ G01P 13/025; G01P 5/165; G01P 13/02; G01P 5/14; G01P 5/16; G01P 5/00;
(Continued)

(56) References Cited

U.S. PATENT DOCUMENTS 4,327,286 A * 4/1982 Thoma .................. B64D 15/20 340/583
5,500,530 A 3/1996 Gregoris
(Continued)

FOREIGN PATENT DOCUMENTS

CN 110606209 A * 12/2019 ............ B64D 15/00
CN 114091185 A * 2/2022
(Continued)

OTHER PUBLICATIONS

International Search Report mailed Oct. 6, 2021, issued in corresponding International Application No. PCT/FR2021/051426, filed Jul. 29, 2021, 6 pages.
(Continued)

*Primary Examiner* — Andre J Allen
(74) *Attorney, Agent, or Firm* — CHRISTENSEN O'CONNOR JOHNSON KINDNESS PLLC

(57) ABSTRACT

A device for detecting a frosting intensity for an aircraft in flight includes a surface for collecting the frost and measuring means capable of measuring the thickness of the frost deposited on the frost collection surface. The device further includes calculation means configured to determine, at predetermined time intervals ($T_{samp}$), the change in the thickness of the frost, and control means configured to generate an alarm signal when the difference in the thickness of the frost measured between two time intervals ($T_{samp}$) is greater than a threshold value.

11 Claims, 3 Drawing Sheets

(58) Field of Classification Search
CPC .......... G01P 21/025; G01P 5/12; G01P 5/245; G01P 5/02; G01P 5/07; G01P 5/26; G01P 1/02; G01P 5/10; G01P 5/06; G01P 5/04; G01P 1/08; G01P 5/08; G01P 5/18; G01P 13/045; G01P 21/00; G01P 5/24; G01P 15/00; G01P 3/62; G01P 5/005; G01P 5/175; G01P 1/026; G01P 5/001; G01P 5/006; G01P 5/083; G01P 5/086; G01P 15/036; G01P 5/241; G01P 7/00; G01P 1/00; G01P 1/023; G01P 1/10; G01P 13/0006; G01P 13/0046; G01P 13/006; G01P 13/0073; G01P 13/04; G01P 15/0802; G01P 15/165; G01P 15/18; G01P 3/263; G01P 3/48; G01P 3/4802; G01P 3/487; G01P 3/489; G01P 3/80; G01P 5/01; G01P 5/17; G01P 5/20; B64D 43/02; B64D 43/00; B64D 15/12; B64D 15/20; B64D 45/00; B64D 15/22; B64D 2045/0085; B64D 15/00; B64D 45/0005; B64D 1/18; B64D 15/06; B64D 15/16; B64D 2033/0286; B64D 33/02; B64D 33/08; B64D 45/04; B64D 1/20; B64D 15/14; B64D 2045/008; B64D 47/00; B64D 13/02; B64D 13/08; B64D 15/04; B64D 2013/0651; B64D 2033/0233; B64D 2045/001; B64D 27/24; B64D 31/00; B64D 31/06; B64D 31/12; B64D 33/04; B64D 37/00; B64D 37/32; B64D 45/02; B64D 47/02; G01B 11/026; G01B 13/00; G01B 13/065
USPC ........................................................ 73/170.02
See application file for complete search history.

(56) References Cited

U.S. PATENT DOCUMENTS

| | | | | | |
|---|---|---|---|---|---|
| 8,462,354 | B2 * | 6/2013 | Barnes | G01B 11/24 356/601 |
| 8,704,181 | B2 * | 4/2014 | Thorez | B64D 15/20 250/341.8 |
| 8,779,945 | B2 * | 7/2014 | Flemming | G01C 23/005 340/963 |
| 10,160,550 | B1 * | 12/2018 | Somanath | G06V 10/764 |
| 2012/0193477 | A1 | 8/2012 | Thorez et al. | |
| 2013/0238282 | A1 * | 9/2013 | Figueroa-Karlstrom | B64D 15/20 702/170 |
| 2022/0041290 | A1 * | 2/2022 | Betush | B64C 3/38 |

FOREIGN PATENT DOCUMENTS

| | | | | | |
|---|---|---|---|---|---|
| CN | 120252595 | A * | 7/2025 | G06F 18/15 |
| DE | 102008044738 | B4 * | 4/2011 | B64D 15/20 |
| GB | 2 056 057 | A | 3/1981 | |
| GB | 2 509 729 | A | 7/2014 | |
| WO | 88/09980 | A1 | 12/1988 | |
| WO | WO-2024165820 | A1 * | 8/2024 | B64D 15/12 |

OTHER PUBLICATIONS

Written Opinion mailed Oct. 6, 2021, issued in corresponding International Application No. PCT/FR2021/051426, filed Jul. 29, 2021, 5 pages.

* cited by examiner

DEVICE FOR DETECTING FROSTING INTENSITY FOR AN AIRCRAFT IN FLIGHT

FIELD OF THE DISCLOSURE

The present disclosure relates to aircrafts and relates more particularly to devices for detecting frosting conditions for an aircraft in flight.

BACKGROUND

When an aircraft flies in an atmosphere at negative temperature, it might encounter clouds containing supercooled drops.

The collision between the cold areas of the aircraft, such as the leading edges of the wings or the air intakes of the engines, and the supercooled drops present in the crossed cloud instantly freezes the drops which accumulate in the form of frost deposit over these areas.

Frost can degrade aerodynamic performances, affecting the airworthiness of the aircraft, but also damage some components of the engines and result in losses of engine thrust.

To prevent the accumulation of frost, aeronautical manufacturers have then equipped aircrafts with heating systems disposed at the areas to be protected.

These systems are designed to protect the critical areas during collisions with supercooled drops whose diameter is smaller than or equal to 100 μm.

Nonetheless, it has been noticed that frost is likely to form beyond the protected areas.

Moreover, in order to avoid the aircraft consuming more energy than necessary, the heating systems are activated only when the aircraft crosses an area likely to create frost.

For this purpose, optical frost detectors have been developed, as described in the French patent No. 2 970 946, which are disposed over outer areas of the aircraft, for example the nose of the aircraft.

More specifically, these frost detectors have a collection surface over which the supercooled drops agglomerate while freezing.

Moreover, they are able to measure the thickness of the frost present over their collection surface and to determine the presence or absence of frost as well as the severity of the frosting conditions.

Nonetheless, under some conditions of temperature and altitude, the presence of supercooled drops whose diameter could reach up to 2 mm has been noticed.

The impact area of a supercooled drop downstream of the leading edge of the wing of an aircraft depends on the inertia and therefore on the diameter of the drop.

Consequently, an aircraft, whose protections have been defined for supercooled drops whose diameter does not exceed 100 μm, is not protected enough when it crosses clouds containing supercooled drops with a diameter larger than 100 μm.

Hence, there is a need to detect the presence of supercooled drops with a diameter larger than 100 μm so that the crew could move the aircraft away from these frosting conditions and thus avoid damaging the aircraft.

SUMMARY

In view of the foregoing, the disclosure proposes overcoming the aforementioned constraints by providing a device for detecting a frosting intensity for an aircraft in flight.

Hence, an object of the disclosure is, according to a first aspect, a method for detecting a frosting intensity for an aircraft in flight, comprising a measurement of the thickness of the frost deposited over a frost collection surface.

The evolution of the thickness of the frost is determined at determined time intervals and, when the difference in thickness of the frost determined between two-time intervals is greater than a threshold value, an alarm signal is generated.

By "frosting intensity", it should be understood a frosting level defined according to a surface over which extends the frost deposited over the critical areas of the aircraft.

In other words, the frosting intensity is determined as a function of the diameter of the supercooled drops contained in the cloud crossed by the aircraft.

Thus, a low frosting intensity is representative of the presence of supercooled drops whose diameter is smaller than or equal to 100 μm. In this case, the heating systems are activated and able to protect the critical areas of the aircraft.

Conversely, a high frosting intensity reflects the presence of supercooled drops whose diameter is larger than 100 μm, which might damage the components of the aircraft.

To determine the frosting intensity, it is advantageous to measure the thickness of the frost at determined time intervals, which, by monitoring its evolution, allows detecting the presence of supercooled drops whose diameter is larger than 100 μm.

Preferably, the average thickness of the frost deposited over the collection surface is calculated as a function of the frosting intensity to be detected and an accretion rate, the time interval corresponding to the ratio between an average thickness of the frost and the accretion rate.

Detecting the frosting intensity corresponds to identifying the presence of supercooled drops having a diameter larger than 100 μm. Thus, the average frost thickness corresponds to the frost thickness generally produced by a supercooled drop having a diameter equal to 100 μm.

Thus, the threshold value is equal to the average thickness of frost deposited by a supercooled drop over the collection surface, the supercooled drop having in this example a diameter larger than or equal to 100 μm.

Advantageously, the frost accretion rate is calculated as a function of at least one water concentration of the frost deposited over the collection surface, a speed of the aircraft in flight and a collection coefficient.

Alternatively, the frost accretion rate is calculated from an evolution slope of the thickness of the frost deposited over the collection surface.

Preferably, the average thickness of the frost is calculated as a function of a density of water, of frost, the frost collection surface and the volume of a supercooled drop having a diameter larger than or equal to 100 μm.

Another object of the disclosure is a device for detecting a frosting intensity for an aircraft in flight, comprising a frost collection surface, measuring means able to measure the thickness of the frost deposited over a frost collection surface.

The device includes calculation means able to determine at determined time intervals the evolution of a thickness of the frost and control means able to generate an alarm signal when a difference in frost thickness measured between two-time intervals is greater than a threshold value.

The calculation means may be implemented in the form of modules in any calculation unit able to execute program instructions and exchange data with other devices.

As an example of a calculation unit, mention may be made of a microprocessor or a microcontroller.

The calculation means may also be implemented in the form of logic circuits in a partially or entirely hardware-based manner.

Preferably, the calculation means are able to calculate the average thickness of the frost deposited over the collection surface as a function of the frosting intensity to be detected and the accretion rate, the time interval being determined by the calculation means and corresponding to the ratio between the average frost thickness and the accretion rate.

Preferably, the calculation means are able to determine the frost accretion rate as a function of at least the water concentration of the frost deposited over the collection surface, the speed of the aircraft in flight and a frost collection coefficient.

Alternatively, the calculation means are able to determine the frost accretion rate from the slope of evolution of the thickness of the frost deposited over the collection surface.

Advantageously, the calculation means are able to determine the average thickness of the frost as a function of the density of water, of frost, the frost collection surface and the volume of a supercooled drop having a diameter larger than or equal to at 100 μm.

Another object of disclosure is an aircraft comprising at least one device for detecting a frosting intensity in flight as defined hereinabove.

Another object of the disclosure is a computer program configured to implement the frosting intensity detection method as defined hereinabove, when executed by the computer.

DESCRIPTION OF THE DRAWINGS

Other aims, features and advantages of the disclosure will appear upon reading the following description, given solely as a non-limiting example, and made with reference to the appended drawings wherein.

DETAILED DESCRIPTION

Figure 1:
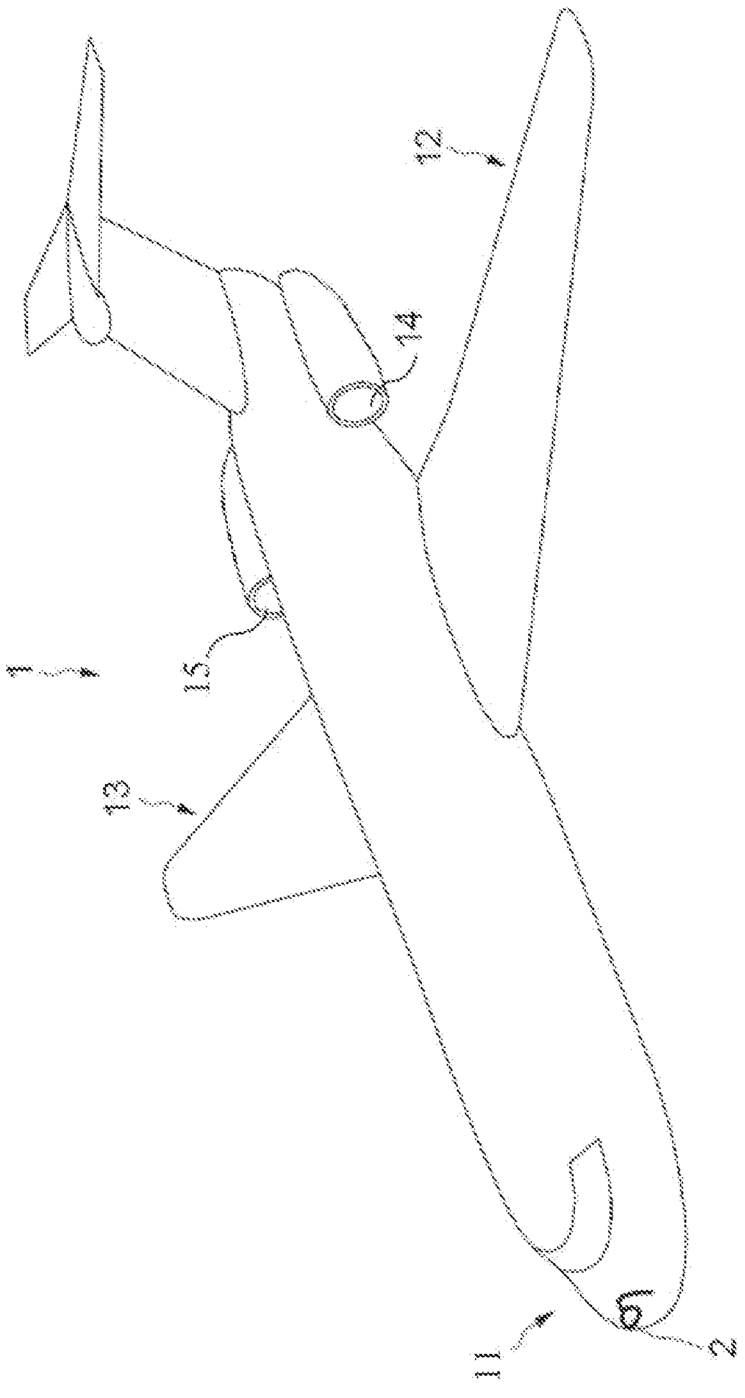
FIG. 1 schematically illustrates an aircraft including a frosting intensity detection device in accordance with the disclosure.

In FIG. 1 is represented an aircraft 1 comprising so-called critical external areas to be protect against frosting, such as the frontal areas 11, the leading edges of the wings 12 and 13 and the engine air intakes 14 and 15.

Indeed, frosting of the leading edges of the wings 12 and 13 modifies the profile of the wing and reduces the lift of the aircraft 1.

With respect to frosting of the frontal areas 11, this might cause the alteration and even the suppression of the transparency of the canopy of the cockpit of the aircraft 1, consequently altering visibility for the crew. Frost can also cause the ingestion of ice on engines 15 and 14 and damage them.

Thus, a frosting intensity detection device 2 is disposed on an outer area of the aircraft 1, herein the frontal zone 11, comprising a collection surface over which the frost is intended to accumulate.

Of course, the device 2 could be located on any other place specified by the aircraft manufacturer and enabling frost to accumulate over its collection surface when the aircraft is in flight phase.

The device 2 is configured to measure the thickness of the frost deposited over its collection surface and to detect the presence of supercooled drops with a diameter larger than 100 μm when the aircraft 1 crosses a cloud.

Figure 2:
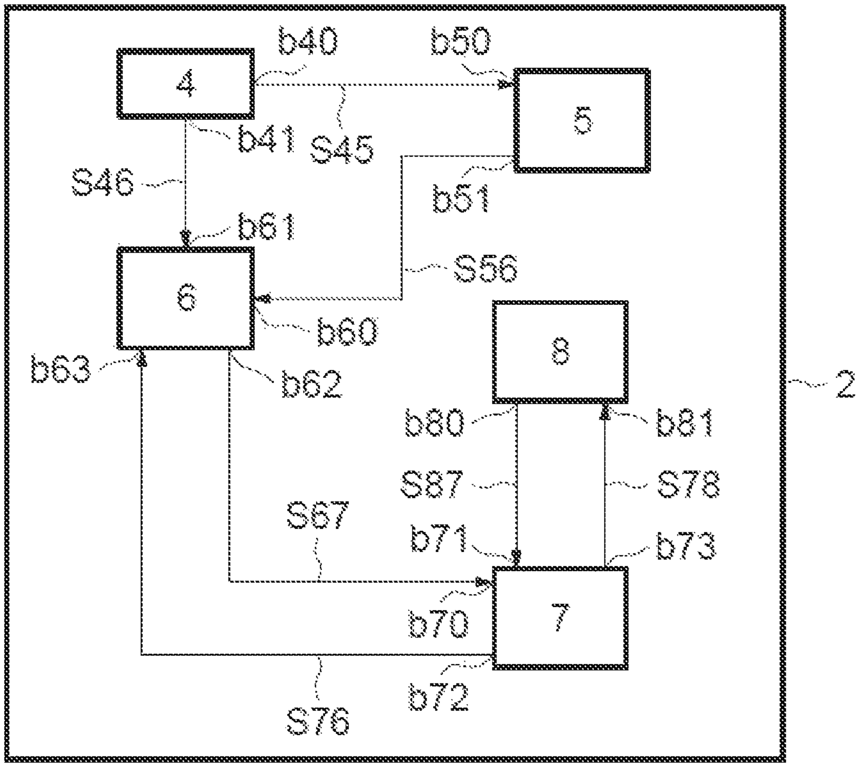
FIG. 2 schematically presents the modules of the frosting intensity detection device according to an embodiment of the disclosure.

To this end, the device 2 comprises measuring means 4, calculation means 6 which communicate with the measuring means 4 as well as control means 7 controlling the calculation means 6, as illustrated in FIG. 2.

More specifically, the measuring means 4 are able to measure the thickness of the frost deposited over the collection surface.

The detection device 2 further comprises storage means 5 intended to memorise the data delivered by the measuring means 4.

To do so, the measuring means 4 include a first output terminal b40 coupled to an input terminal b50 of the storage means 5.

The measuring means 4 deliver a signal S45 to the storage means 5 containing the acquired data.

The storage means 5 further include an output terminal b51 coupled to a first input terminal b60 of the calculation means 6 to deliver a signal S56 thereto.

The calculation means 6 further have access to the data acquired instantaneously by the measuring means 4.

More particularly, the calculation means 6 include a second input terminal b61 coupled to a second output terminal b41 of the measuring means 4, which enables the measuring means 4 to deliver a signal S46 containing the data relating to the frost thickness.

The calculation means 6 are configured to perform calculations using the data from the signals S56 and S46.

At the end of these calculations, the calculation means 6 deliver, via an output terminal b62, a signal S67 to a first input terminal b70 of the control means 7.

For example, the signal S67 may be in the form of a binary signal. Thus, depending on the received value, "0" or "1", the control means 7 activate an alarm or not. It should be noted that the alarm may be in the form of information displayed on the instrument panel of the crew of the aircraft 1 so that the latter could manually divert the aircraft.

The alarm may also be in the form of data to be transmitted to other modules of the aircraft intended to automatically perform diversion operations via the autopilot.

It should be noted that the calculation means 6 are configured to deliver the signal S67 at determined time intervals.

To do this, the icing intensity detection device 2 further includes a timer 8 having an output terminal b80 coupled to a second input terminal b71 of the control means 7, to deliver the signal S87 thereto.

The signal S87 may be in a binary form, wherein the value "1" symbolises the end of counting and the value "0" means that counting is in progress.

Moreover, the timer 8 is configured to restart counting when it expires.

This time interval may also be modified by a signal S78 received at an input terminal b81, this signal being delivered by the control means 7 via a second output terminal b73.

Once counting is completed, the control means 7 deliver the signal S76 at the output b72 and supply it to a third input terminal b63 of the calculation means 6.

The signal S76 is intended to activate the calculation means 6 so that these could receive the signal S46 delivered by the measuring means 4 and the signal S56 originating from the storage means 5 and thus perform the calculations.

Figure 3A:
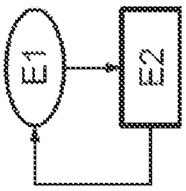
FIGS. 3A and 3B illustrate two flowcharts of a frosting intensity detection method implemented by the device and, FIGS. 4A and 4B each illustrates a flowchart relating to a method for determining a time interval according to an implementation of the disclosure.
Figure 3B:
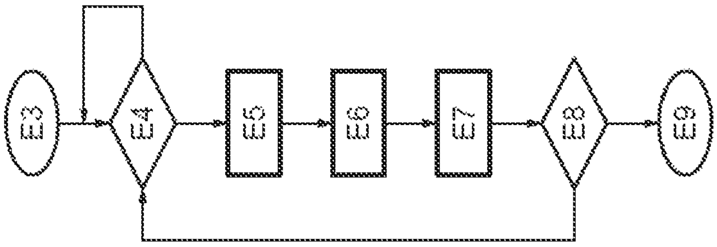

Reference is made to FIGS. 3A and 3B which illustrate the frosting intensity detection method implemented by the device 3.

Referring to FIG. 3A, the frosting intensity detection method starts with a step E1, during which the measuring means 4 measure the thickness of the frost deposited over their collection surface.

In step E2, the measuring means 4 transmit the data relating to the thickness measured during the previous step, by delivering the signal S45 containing the data to the storage means 5, so that the calculation means 6 could use them afterwards.

Since the discrimination of the supercooled drops with a given diameter is possible only by measuring at determined time intervals, the evolution of the thickness of the frost deposited over the collection surface, steps E1 and E2 are thus, in this example, repeated only between each time interval in order to avoid useless energy consumption.

Parallel to steps E1 and E2 and with reference to FIG. 3B, the timer 8 transmits the signal S87 at each iteration to the control means 7 in step E3.

In the next step E4, the control means 7 verify whether the signal S87 contains the value "1" or "0".

If the value is equal to "0", we return to step E3 in which the control means 7 acquires the signal S87 again.

Otherwise, we proceed with step E5 in which the control means 7 activate the calculation means 6 by delivering the signal S76 thereto.

Once activated, the calculation means 6 retrieve in step E6, the data of the signal S46 from the measuring means 4 as well as the data of the signal S56 originating from the storage means 5.

Thus, the calculation means 6 have data relating to the frost thicknesses measured between two determined time intervals in order to compare them in step E7 and thus determine the evolution of the thickness of the frost.

More particularly, the calculation means 6 compare the evolution of the thickness of the frost with a threshold value which corresponds to a difference in thickness reflecting the presence of supercooled drops whose diameter is larger than 100 μm.

Thus, if the difference in thickness measured between two determined time intervals is greater than or equal to the threshold value, the calculation means 6 deliver to the control means 7 the signal S67 containing the value "1". If not, the control means 7 deliver the signal S67 including the value "0".

During step E8, the control means 7 verify whether the signal S67 contains the value "1" or "0".

If it is the value "0", we return to step E4. If it is the value "1", the control means 7 deliver an alarm signal in step E9.

Figure 4A:
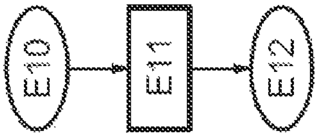
Figure 4B:
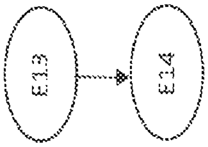

Reference is made to FIGS. 4A and 4B each illustrating a flowchart of a method for calculating the time interval which is defined by the following relationship:

$$T_{samp} = \frac{e_{th}}{IAR_{mes}} \quad (1)$$

where $e_{th}$ refers to the constant average thickness of the frost deposited by a supercooled drop over the collection surface of the detection device 2, the supercooled drop having in this example a diameter to be discriminated equal to 100 μm and, $IAR_{mes}$ the frost accretion rate, expressed in metres per second.

In order to be able to calculate the time interval $T_{samp}$, the calculation means 6 acquire, in step E10, the average thickness $e_{th}$ as well as the frost accretion rate $IAR_{mes}$.

In step E11, the calculation means 6 determine, according to the equation (1), the time interval $T_{samp}$ then transmit it to the control means 7 in step E12.

Afterwards, the calculation means 7 send signal S78 to the timer 8 so that its countdown corresponds to the determined time interval.

Referring to FIG. 4B, the calculation means 6 are further configured to calculate the accretion rate $IAR_{mes}$ determined by the following relationship:

$$IAR_{mes} = \frac{\eta \times \beta \times LWC \times TAS}{\rho_i} \quad (4)$$

where β refers to the collection coefficient of the device 2;

η the frost portion over the collection surface of the device 2;

LWC, the water concentration of the cloud crossed in grams per cubic metre and,

TAS, the speed of the aircraft 1 relative to the air mass in which it is flying, expressed in metres per second.

The calculation means 6 begin by retrieving from the storage means 5 the data relating to the speed TAS of the aircraft 1, the frost portion η as well as the collection coefficient β of the device 2 in step E13.

During step E14, the calculation means 6 calculate the accretion rate $IAR_{mes}$.

For example, considering that the water concentration is equal to 0.2 g/m$^3$, the speed of the aircraft 1 equal to 230 m/s as well as a device 2 having a collection coefficient equal to 0.8 and a collection surface of 3. $10^{-5}$ m$^2$, the accretion rate $IAR_{mes}$ calculated by the calculation means 6 will be equal to 4. $10^{-5}$ m/s.

The average thickness $e_{th}$ is equal to 0.019 μm for a drop with a diameter equal to 100 μm and having a volume equal to 5.24. $10^{-13}$ m$^3$.

Moreover, it should be noted that the average frost thickness $e_{th}$ which corresponds to the threshold value, is determined only once according to the following relationship:

$$e_{th} = \frac{\rho_w \times v_d}{\rho_i \times St} \quad (2)$$

where $\rho_w$ refers to water density which is equal to 1,000,000 g/m$^3$;

$\rho_i$ the frost density, equal to 917,000 g/m$^3$;

St, the surface area expressed in square metres of the collection surface of the frost detector 2, and, $V_d$, the volume in cubic metres of a supercooled drop having a diameter to be discriminated equal to 100 μm.

Thus, the time interval between two measurements is equal to 476 μs, which means that a drop with a diameter of 200 μm will be detected after 8 measurements. In other words, there cannot be an evolution in frost thickness greater than the threshold value for 7 intervals.

Nonetheless, a drop having a diameter equal to 500 μm will be detected every 125 measurements.

Moreover, the disclosure is not limited to these embodiments and implementations but encompasses all variants thereof. For example, one could choose to determine a frosting intensity corresponding to supercooled drops whose diameter is larger than 200 μm and adjust the time interval between two measurements accordingly.

The invention claimed is:

1. A method for detecting a frosting intensity for an aircraft in flight, comprising the steps of: measuring a thickness of frost deposited over a frost collection surface; determining, at determined time intervals (Tsamp), an evolution of a frost thickness; and generating an alarm signal when a difference in frost thickness measured between two time intervals (Tsamp) is greater than a threshold value.

2. The method according to claim 1, further comprising the step of calculating an average thickness of frost (eth) deposited over the collection surface as a function of the frosting intensity to be detected and of a frost accretion rate (IARmes), the time interval (Tsamp) corresponding to the ratio between the average frost thickness (eth) and the frost accretion rate (IARmes).

3. The method according to claim 2, wherein the frost accretion rate (IARmes) is calculated as a function of at least a water concentration of the frost (LWC) deposited over the collection surface, a speed (TAS) of the aircraft in flight, and a frost collection coefficient (β).

4. The method according to claim 2, wherein the frost accretion rate (IARmes) is calculated from a slope of evolution of the thickness of frost deposited over the frost collection surface.

5. The method according to claim 2, wherein the average frost thickness (eth) is calculated as a function of a water density (ρw), a frost density (ρi), a surface area of the frost collection surface (St), and a volume of a supercooled drop (Vd) having a diameter larger than or equal to 100 μm.

6. A device for detecting a frosting intensity for an aircraft in flight, the device comprising a surface for collecting frost; measuring means configured to measure a thickness of frost deposited over the frost collection surface; calculation means configured to determine, at determined time intervals (Tsamp), an evolution of the frost thickness; and control means configured to generate an alarm signal when a difference in frost thickness measured between two time intervals (Tsamp) is greater than a threshold value.

7. The device according to claim 6, wherein the calculation means are configured to calculate an average thickness of the (eth) deposited over the collection surface as a function of the frosting intensity to be detected and of an accretion rate (IARmes), the time interval (Tsamp) being calculated by the calculation means and corresponding to a ratio between the average frost thickness (eth) and the accretion rate (IARmes).

8. The device according to claim 7, wherein the calculation means are configured to determine the frost accretion rate (IARmes) as a function of at least a water concentration of the frost (LWC) deposited over the collection surface, a speed (TAS) of the aircraft in flight, and a frost collection coefficient (β).

9. The device according to claim 7, wherein the calculation means are configured to determine the frost accretion rate (IARmes) from a slope of evolution of the thickness of frost deposited over the frost collection surface.

10. The device according to claim 7, wherein the calculation means are configured to determine the average frost thickness (eth) as a function of the density of water (ρw), frost (ρi), the frost collection surface (St), and the volume of a supercooled drop (Vd) having a diameter larger than or equal to 100 μm.

11. An aircraft comprising at least one device for detecting a frosting intensity for an aircraft in flight, the at least one device comprising a surface for collecting frost; measuring means configured to measure a thickness of frost deposited over the frost collection surface calculation means configured to determine, at determined time intervals (Tsamp), an evolution of the frost thickness; and control means configured to generate an alarm signal when a difference in frost thickness measured between two time intervals (Tsamp) is greater than a threshold value.

* * * * *